United States Patent
Wong

(10) Patent No.: US 12,231,848 B2
(45) Date of Patent: Feb. 18, 2025

(54) HEARING-AID AUDIO CONTROL METHOD AND SYSTEM

(71) Applicant: Maxlink Global Technology Limited, Taipei (TW)

(72) Inventor: Jian-Shing Wong, Taichung (TW)

(73) Assignee: MAXLINK GLOBAL TECHNOLOGY LIMITED, Taipei (TW)

( * ) Notice: Subject to any disclaimer, the term of this patent is extended or adjusted under 35 U.S.C. 154(b) by 228 days.

(21) Appl. No.: 18/063,389

(22) Filed: Dec. 8, 2022

(65) Prior Publication Data

US 2024/0015448 A1    Jan. 11, 2024

(51) Int. Cl.
*H04R 25/00* (2006.01)

(52) U.S. Cl.
CPC ........... *H04R 25/353* (2013.01); *H04R 25/30* (2013.01); *H04R 25/505* (2013.01)

(58) Field of Classification Search
CPC ...... H04R 25/70; H04R 25/30; H04R 25/505; H04R 25/353; H04R 2225/41; H04R 2205/041; H04R 2460/05
USPC ........................................ 381/312, 23.1, 316
See application file for complete search history.

(56) References Cited

U.S. PATENT DOCUMENTS

| | | | |
|---|---|---|---|
| 9,924,269 B1* | 3/2018 | Tu | H03G 5/165 |
| 2011/0051943 A1* | 3/2011 | Giese | H04R 25/70 |
| | | | 381/60 |

* cited by examiner

*Primary Examiner* — Norman Yu
(74) *Attorney, Agent, or Firm* — Sinorica International Patent & Trademark

(57) ABSTRACT

A hearing-aid audio control method and system are disclosed. The method includes the steps of obtaining a hearing compensation curve of a hearing-impaired person in advance; receiving and obtaining an original audio signal; using the hearing compensation curve to perform power compensation on a corresponding frequency band of the original audio signal to obtain a hearing-aid audio signal; outputting the hearing-aid audio signal and/or using the hearing-aid audio signal to drive operation of an audio system. The method can use the hearing compensation curve of the hearing-impaired person to perform power compensation on the corresponding frequency band of the original audio signal to obtain the hearing-aid audio signal. By adjusting the volume of the corresponding audio frequency bands, the hearing-impaired can hear the sound clearly, without continuous hearing loss due to excessive volume adjustment and without disturbing other people.

8 Claims, 5 Drawing Sheets

HEARING-AID AUDIO CONTROL METHOD AND SYSTEM

FIELD OF THE INVENTION

The present invention relates to acoustic equipment, and more particularly to a hearing-aid audio control method and system.

BACKGROUND OF THE INVENTION

Audio equipment having external speakers, such as stereos, televisions, personal computers, home theaters and game consoles, has gradually become popular. Most of the above-mentioned devices are developed based on the needs of consumers. For the hard-of-hearing people, such as the elderly and the hearing-impaired, the products will not be customized according to their needs. When the hearing-impaired use these devices, because they cannot hear the sound clearly, they often need to adjust the volume of these devices to a higher level to hear the sound clearly. This may cause discomfort to other people/neighbors or comprehensive hearing loss caused by prolonged exposure to excessive volume.

The generally accepted standard hearing range for humans is 20 to 20,000 Hz. For the hearing-impaired, especially the elderly, the sounds in the middle and high frequency bands are often not heard clearly due to functional degradation, but not all audio frequency bands. The hearing of the hearing-impaired person is not much different from that of the normal person in some audio frequency bands. Therefore, the hearing effect can be improved by adjusting each audio frequency band according to the hearing curve and then outputting the sound.

Electronic hearing aids are widely used for the hearing-impaired. Electronic hearing aids can provide hearing-impaired people with power compensation in specific audio frequency bands after personalized adjustment. That is, compensation is made for the impaired audio band nodes of the hearing-impaired, and no compensation is made for other audio band nodes that are not impaired, so as to avoid excessively amplifying all audio frequency bands to cause discomfort or even permanent damage to the hearing-impaired.

However, wearing electronic hearing aids is not a small problem in actual use, operation and maintenance for the elderly and some hearing-impaired people. It is easy to cause economic burden. Therefore, how to perform hearing-aid control on an external audio system has become an urgent problem to be solved.

SUMMARY OF THE INVENTION

One of the objects of the present invention is to provide a hearing-aid audio control method, which can adjust the volume of some audio frequency bands according to the input hearing curve data for audio equipment having external speakers, such as stereos, televisions, personal computers, home theaters, and game consoles.

Another object of the present invention is to provide a hearing-aid audio system, which can adjust the volume of some audio frequency bands according to the input hearing curve data for audio equipment having external speakers, such as stereos, televisions, personal computers, home theaters, and game consoles.

In order to achieve the above objects, the present invention provides the following technical solution:

A hearing-aid audio control method, comprising the steps of:
S1: obtaining a hearing compensation curve of a hearing-impaired person in advance;
S2: receiving and obtaining an original audio signal;
S3: using the hearing compensation curve to perform power compensation on a corresponding frequency band of the original audio signal to obtain a hearing-aid audio signal;
S4: outputting the hearing-aid audio signal and/or using the hearing-aid audio signal to drive operation of an audio system.

In the foregoing technical solution, the step S1 includes:
S1.1: selecting a plurality of audio frequency nodes for conducting a hearing test on the hearing-impaired person to obtain a bare-ear hearing threshold curve of the hearing-impaired person;
S1.2: performing power compensation on impaired audio frequency nodes of the hearing-impaired person according to the bare-ear hearing threshold curve until a hearing curve of the hearing-impaired person falls within a range of a normal hearing curve;
S1.3: in the step S1.2, recording a power compensation amount at each of the audio frequency nodes to form a hearing compensation curve.

In the foregoing technical solution, in the step S1.1, the selected audio frequency nodes include at least one of 250 Hz, 500 Hz, 1000 Hz, 2000 Hz, 4000 Hz, 6000 Hz and 8000 Hz.

In the foregoing technical solution, the step S2 includes:
S2.1: determining a type of the received signal;
S2.2: if the received signal is a pure digital audio signal, converting the pure digital audio signal into an analog audio signal, using the analog audio signal as the original audio signal, and proceeding to the step S3;
S2.3: if the received signal is a digital audio-visual signal, separating a digital audio signal from the digital audio-visual signal, converting the digital audio signal into the analog audio signal, using the analog audio signal as the original audio signal, and proceeding to the step S3;
S2.4: if the received signal is the analog audio signal, using the analog audio signal as the original audio signal, and proceeding to the step S3.

In the foregoing technical solution, in the step S3, the hearing compensation curve is superimposed on the original audio signal.

A hearing-aid audio system, comprising:
a hearing-aid compensation module, configured to obtain a hearing compensation curve of a hearing-impaired person in advance;
a signal receiving module, configured to receive and obtain an original audio signal;
a compensation processing module, configured to use the hearing compensation curve to perform power compensation on a corresponding frequency band of the original audio signal to obtain a hearing-aid audio signal; and
an output driving module, configured to output the hearing-aid audio signal and/or use the hearing-aid audio signal to drive operation of the audio system.

In the foregoing technical solution, the hearing-aid compensation module includes:
a hearing test sub-module, configured to select a plurality of audio frequency nodes to conduct a hearing test for the hearing-impaired person;

a bare-ear hearing threshold curve generation sub-module, configured to generate a bare-ear hearing threshold curve according to a test result of the hearing test sub-module;

a power compensation sub-module, configured to perform power compensation on impaired audio frequency nodes of the hearing-impaired person according to the bare-ear hearing threshold curve until a hearing curve of the hearing-impaired person falls within a range of a normal hearing curve, and record a power compensation amount at each of the audio frequency nodes to form the hearing compensation curve;

a compensation output sub-module, configured to output the hearing compensation curve.

In the foregoing technical solution, in the hearing test sub-module, the selected audio frequency nodes include at least one of 250 Hz, 500 Hz, 1000 Hz, 2000 Hz, 4000 Hz, 6000 Hz and 8000 Hz.

In the foregoing technical solution, the signal receiving module includes:

a signal determination sub-module, configured to determine a type of the received signal;

a digital audio signal separation sub-module, configured to separate a digital audio signal from a digital audio-visual signal;

a digital-to-analog conversion sub-module, configured to convert the digital audio signal into an analog audio signal as the original audio signal;

an output module, configured to output the original audio signal to the compensation processing module.

In the foregoing technical solution, the compensation processing module is configured to superimpose the hearing compensation curve on the original audio signal.

Compared with prior art, the beneficial effect of the present invention is:

1. The hearing-aid audio control method can use the hearing compensation curve of the hearing-impaired person to perform power compensation on the corresponding frequency band of the original audio signal to obtain the hearing-aid audio signal. By adjusting the volume of audio equipment having external speakers, such as stereos, televisions, personal computers, home theaters, and game consoles, the hearing-impaired can hear the sound clearly, without continuous hearing loss due to excessive volume adjustment and without disturbing other people.

2. The hearing-aid audio system can use the hearing compensation curve of the hearing-impaired person to perform power compensation on the corresponding frequency band of the original audio signal to obtain the hearing-aid audio signal. By adjusting the volume of audio equipment having external speakers, such as stereos, televisions, personal computers, home theaters, and game consoles, the hearing-impaired can hear the sound clearly, without continuous hearing loss due to excessive volume adjustment and without disturbing other people.

DETAILED DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. It will be understood by those of ordinary skill in the art that various changes in form and details may be made therein without departing from the spirit and scope of the present invention as defined by the following claims and their equivalents.

First Embodiment

This embodiment provides a hearing-aid audio control method, which can be applied to audio equipment having external speakers, such as stereos, televisions, personal computers, home theaters, and game consoles.

Figure 1:
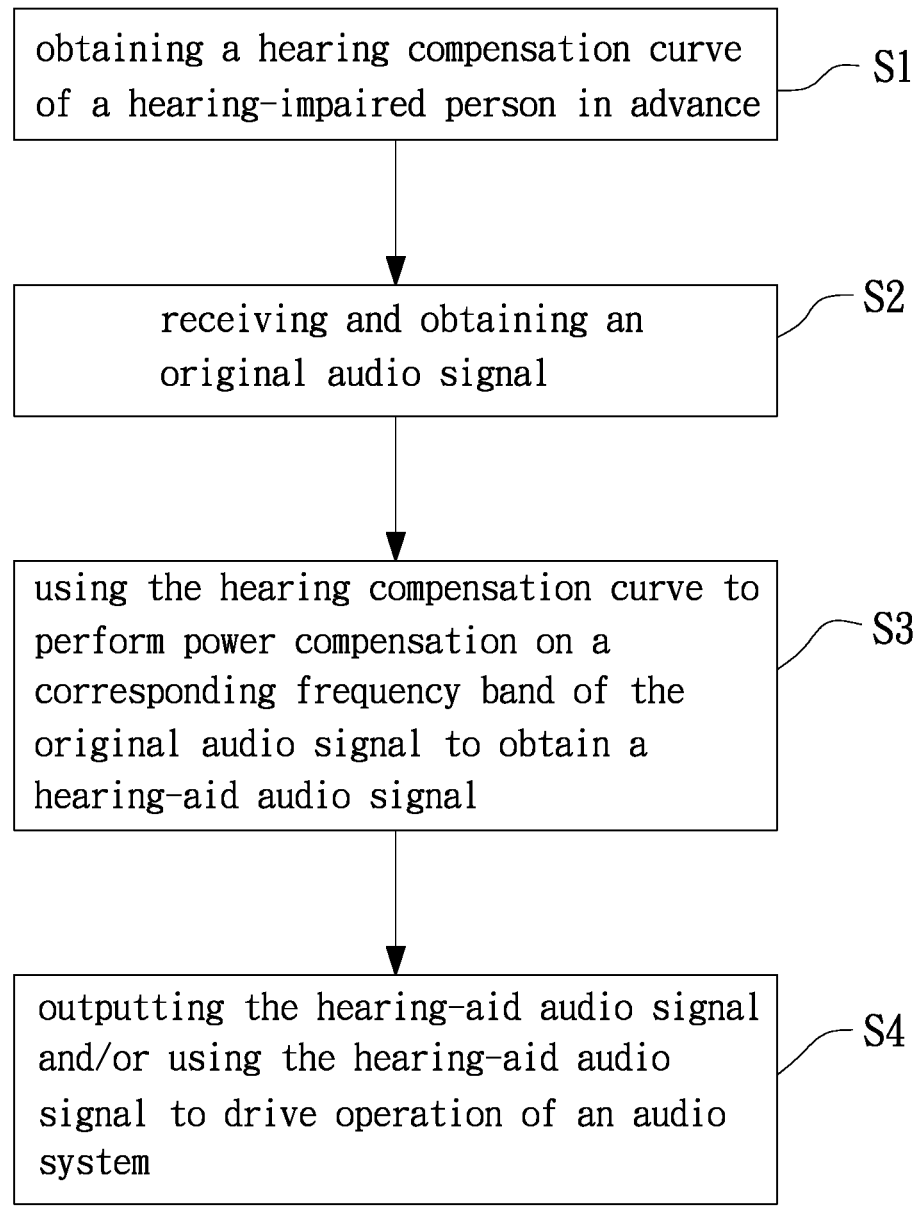
FIG. 1 is a flow chart according to a first embodiment of the present invention.

Please refer to FIG. 1. The hearing-aid audio control method comprises the steps of:

S1: obtaining a hearing compensation curve of a hearing-impaired person in advance;

S2: receiving and obtaining an original audio signal;

S3: using the hearing compensation curve to perform power compensation on a corresponding frequency band of the original audio signal to obtain a hearing-aid audio signal;

S4: outputting the hearing-aid audio signal and/or using the hearing-aid audio signal to drive the operation of an audio system.

Figure 2:
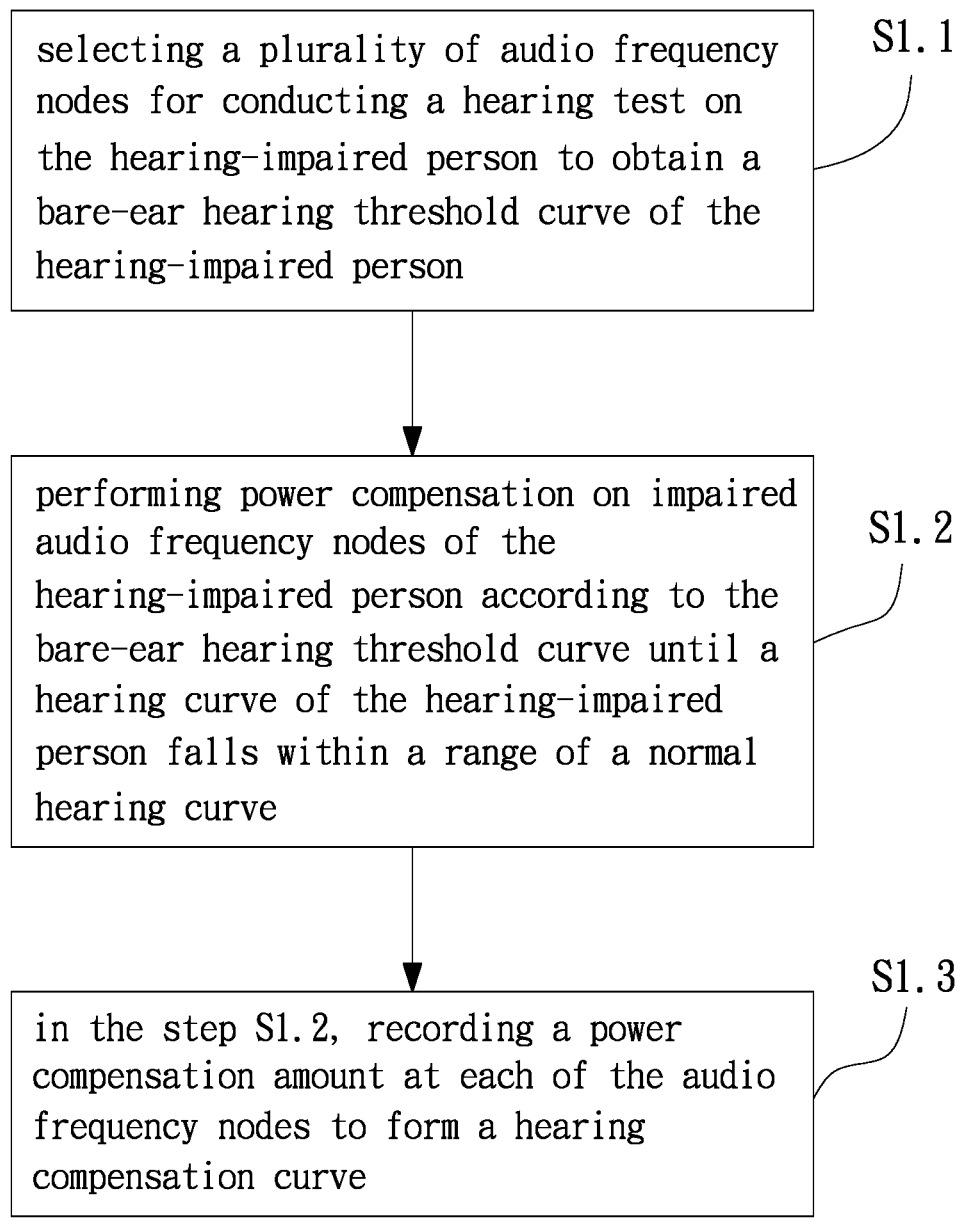
FIG. 2 is a flow chart of the step S1 according to the first embodiment of the present invention.

Please refer to FIG. 2. Specifically, the step S1 includes:

S1.1: selecting a plurality of audio frequency nodes for conducting a hearing test on the hearing-impaired person to obtain a bare-ear hearing threshold curve of the hearing-impaired person.

In this step, the selected audio frequency nodes include at least one of 250 Hz, 500 Hz, 1000 Hz, 2000 Hz, 4000 Hz, 6000 Hz and 8000 Hz.

In fact, using broadcasting equipment, such as a hearing test instrument, to play sounds of various audio frequencies such as 250 Hz, 500 Hz, 1000 Hz, 2000 Hz, 4000 Hz, 6000 Hz, and 8000 Hz. For each audio frequency, the volume is turned from low to high until the hearing-impaired person can hear the sound clearly. The volume (dB) at which the hearing-impaired person can clearly hear the sound at each audio frequency is recorded. The bare-ear hearing threshold curve is obtained by taking the audio frequency as the X-axis and the volume (dB) when the hearing-impaired person can hear the sound clearly as the Y-axis.

S1.2: performing power compensation on the impaired audio frequency nodes of the hearing-impaired person according to the bare-ear hearing threshold curve until the hearing curve of the hearing-impaired person falls within the range of the normal hearing curve;

Specifically, at each audio frequency, subtract the volume (dB) at which the normal person can hear the sound clearly from the volume (dB) at which the hearing-impaired person can hear the sound clearly to obtain a power compensation amount (dB) at each audio frequency.

S1.3: In the step S1.2, recording the power compensation amount at each audio frequency node to form a hearing compensation curve.

Specifically, the hearing compensation curve is obtained by taking the audio frequency as the X-axis and the power compensation amount (dB) as the Y-axis.

Figure 3:
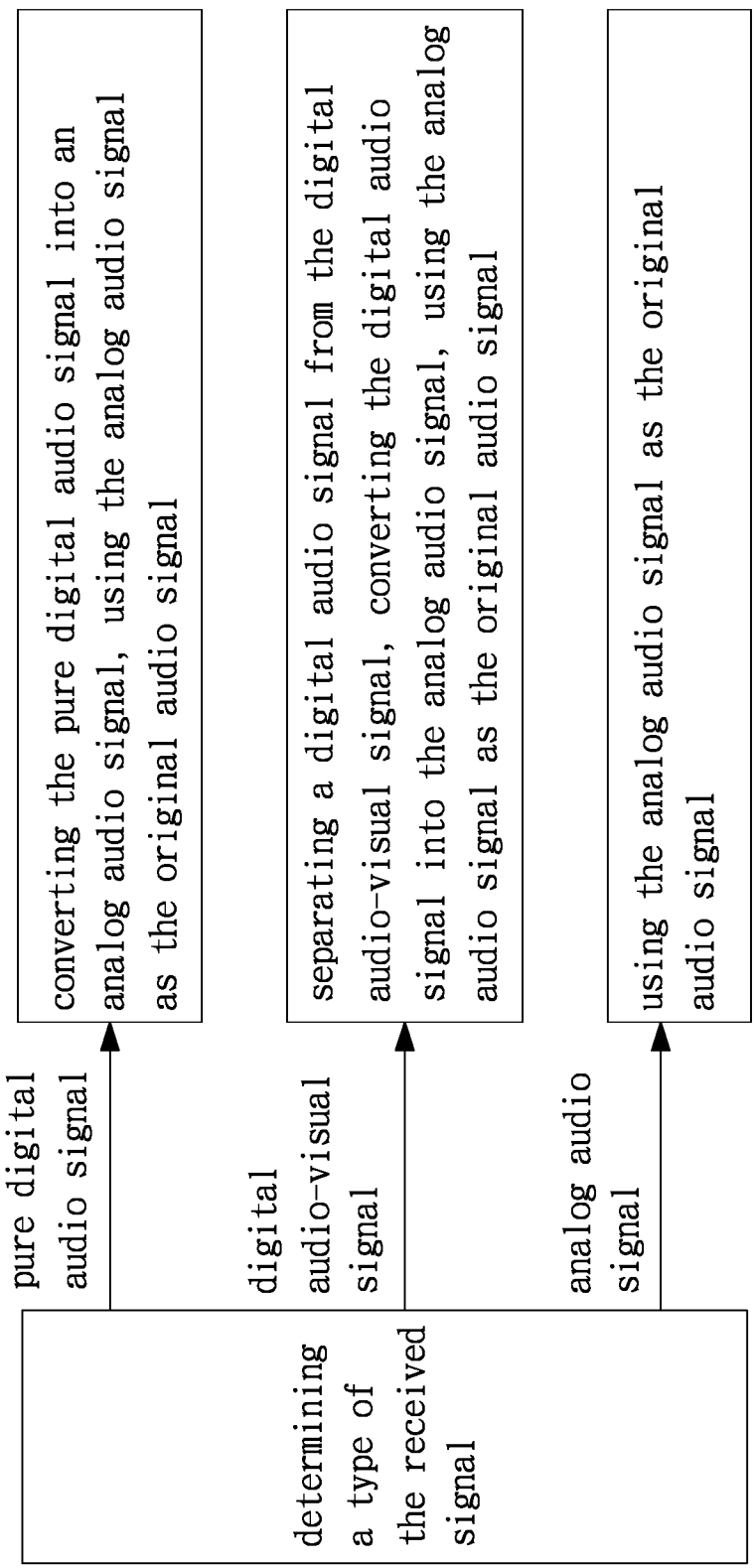
FIG. 3 is a flow chart of the step S3 according to the first embodiment of the present invention.

Please refer to FIG. 3. Specifically, the step S2 includes:

S2.1: determining a type of the received signal;

S2.2: if the received signal is a pure digital audio signal, using the pure digital audio signal as the original audio signal, and proceeding to the step S3;

S2.3: if the received signal is a digital audio-visual signal, separating a digital audio signal from the digital audio-visual signal, using the digital audio signal as the original audio signal, and proceeding to the step S3;

S2.4: if the received signal is an analog audio signal, converting the analog audio signal into a digital audio signal, using the digital audio signal as the original audio signal, and proceeding to the step S3.

In fact, it is only necessary to distinguish the signal source to determine the type of the received signal. For example, the signal received from a wired or wireless LAN, Bluetooth network, or HDMI interface is a pure digital audio signal; if the digital audio-visual signal is received from the HDMI interface, the audio channel is separated to obtain the original audio signal; the signal received from the analog audio signal input interface, such as 3.5 mm audio interface and RCA connector, is an analog audio signal. The analog audio signal can be converted into a digital audio signal by using a DSP chip or a power amplifier module with an A/D conversion function.

Specifically, in the step S3, the hearing compensation curve is superimposed on the original audio signal; that is, on the basis of the original audio signal (dB), the power compensation amount (dB) is superimposed to realize power compensation.

Specifically, in the step S4, the hearing-aid audio signal is output via digital audio channel, or converted into an analog form and then output via an analog audio channel, or the hearing-aid audio signal is used to drive the operation of the power amplifier module and the operation of the speaker.

The hearing-aid audio control method can use the hearing compensation curve of the hearing-impaired person to perform power compensation on the corresponding frequency band of the original audio signal to obtain the hearing-aid audio signal. By adjusting the volume of audio equipment having external speakers, such as stereos, televisions, personal computers, home theaters, and game consoles, the hearing-impaired can hear the sound clearly, without continuous hearing loss due to excessive volume adjustment and without disturbing other people.

Second Embodiment

This embodiment provides a hearing-aid audio system, which can be applied to audio equipment having external speakers, such as stereos, televisions, personal computers, home theaters, and game consoles.

Figure 4:
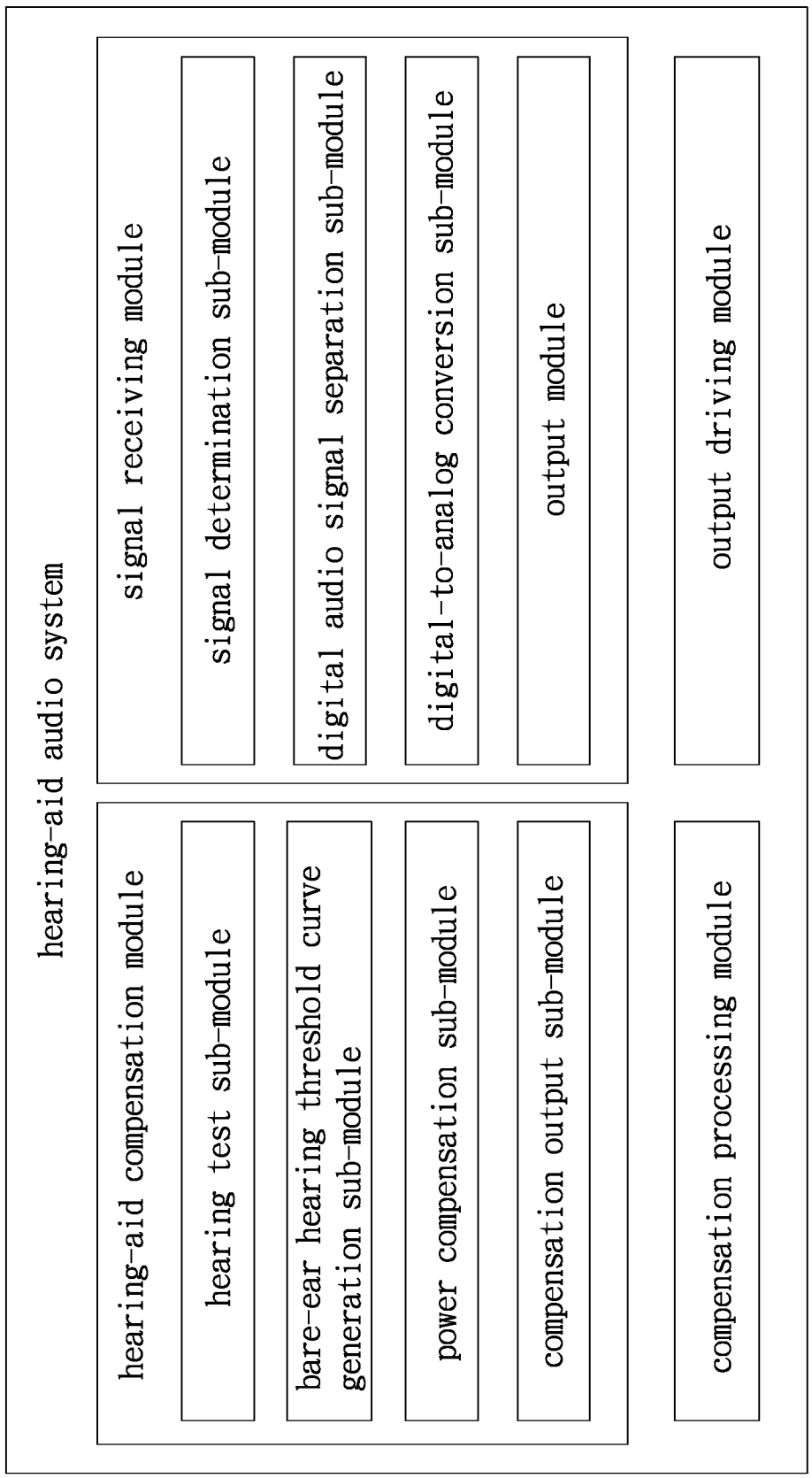
FIG. 4 is a schematic diagram of the system according to a second embodiment of the present invention.

Please refer to FIG. 4. The hearing-aid audio system comprises:

a hearing-aid compensation module, configured to obtain a hearing compensation curve of a hearing-impaired person in advance;

a signal receiving module, configured to receive and obtain an original audio signal;

a compensation processing module, configured to use the hearing compensation curve to perform power compensation on a corresponding frequency band of the original audio signal to obtain a hearing-aid audio signal; and an output driving module, configured to output the hearing-aid audio signal and/or use the hearing-aid audio signal to drive the operation of an audio system.

Specifically, the hearing-aid compensation module includes:

a hearing test sub-module, configured to select a plurality of audio frequency nodes to conduct a hearing test for the hearing-impaired person;

a bare-ear hearing threshold curve generation sub-module, configured to generate a bare-ear hearing threshold curve according to the test result of the hearing test sub-module;

a power compensation sub-module, configured to perform power compensation on the impaired audio frequency nodes of the hearing-impaired person according to the bare-ear hearing threshold curve until the hearing curve of the hearing-impaired person falls within the range of the normal hearing curve, and record the power compensation amount at each audio frequency node to form the hearing compensation curve;

a compensation output sub-module, configured to output the hearing compensation curve.

In the hearing test sub-module, the selected audio frequency nodes include at least one of 250 Hz, 500 Hz, 1000 Hz, 2000 Hz, 4000 Hz, 6000 Hz and 8000 Hz.

In fact, using broadcasting equipment, such as a hearing test instrument, to play sounds of various audio frequencies such as 250 Hz, 500 Hz, 1000 Hz, 2000 Hz, 4000 Hz, 6000 Hz, and 8000 Hz. For each audio frequency, the volume is turned from low to high until the hearing-impaired person can hear the sound clearly. The volume (dB) at which the hearing-impaired person can clearly hear the sound at each audio frequency is recorded. The bare-ear hearing threshold curve is obtained by taking the audio frequency as the X-axis and the volume (dB) when the hearing-impaired person can hear the sound clearly as the Y-axis.

At each audio frequency, subtract the volume (dB) at which the normal person can hear the sound clearly from the volume (dB) at which the hearing-impaired person can hear the sound clearly to obtain a power compensation amount (dB) at each audio frequency; the hearing compensation curve is obtained by taking the audio frequency as the X-axis and the power compensation amount (dB) as the Y-axis.

Specifically, the signal receiving module includes:

a signal determination sub-module, configured to determine a type of the received signal;

a digital audio signal separation sub-module, configured to separate a digital audio signal from a digital audio-visual signal;

a digital-to-analog conversion sub-module, configured to convert the digital audio signal into an analog audio signal as the original audio signal;

an output module, configured to output the original audio signal to the compensation processing module.

In fact, it is only necessary to distinguish the signal source to determine the type of the received signal. For example, the signal received from a wired or wireless LAN, Bluetooth network, or HDMI interface is a pure digital audio signal; if the digital audio-visual signal is received from the HDMI interface, the audio channel is separated to obtain the original audio signal; the signal received from the analog audio signal input interface, such as 3.5 mm audio interface and RCA connector, is an analog audio signal. The analog audio signal can be converted into a digital audio signal by using a DSP chip or a power amplifier module with an A/D conversion function as the digital-to-analog conversion sub-module.

Specifically, the compensation processing module is configured to superimpose the hearing compensation curve on the original audio signal; that is, on the basis of the original audio signal (dB), the power compensation amount (dB) is superimposed to realize power compensation.

The hearing-aid audio system can use the hearing compensation curve of the hearing-impaired person to perform power compensation on the corresponding frequency band of the original audio signal to obtain the hearing-aid audio signal. By adjusting the volume of audio equipment having external speakers, such as stereos, televisions, personal computers, home theaters, and game consoles, the hearing-impaired can hear the sound clearly, without continuous hearing loss due to excessive volume adjustment and without disturbing other people.

Figure 5:
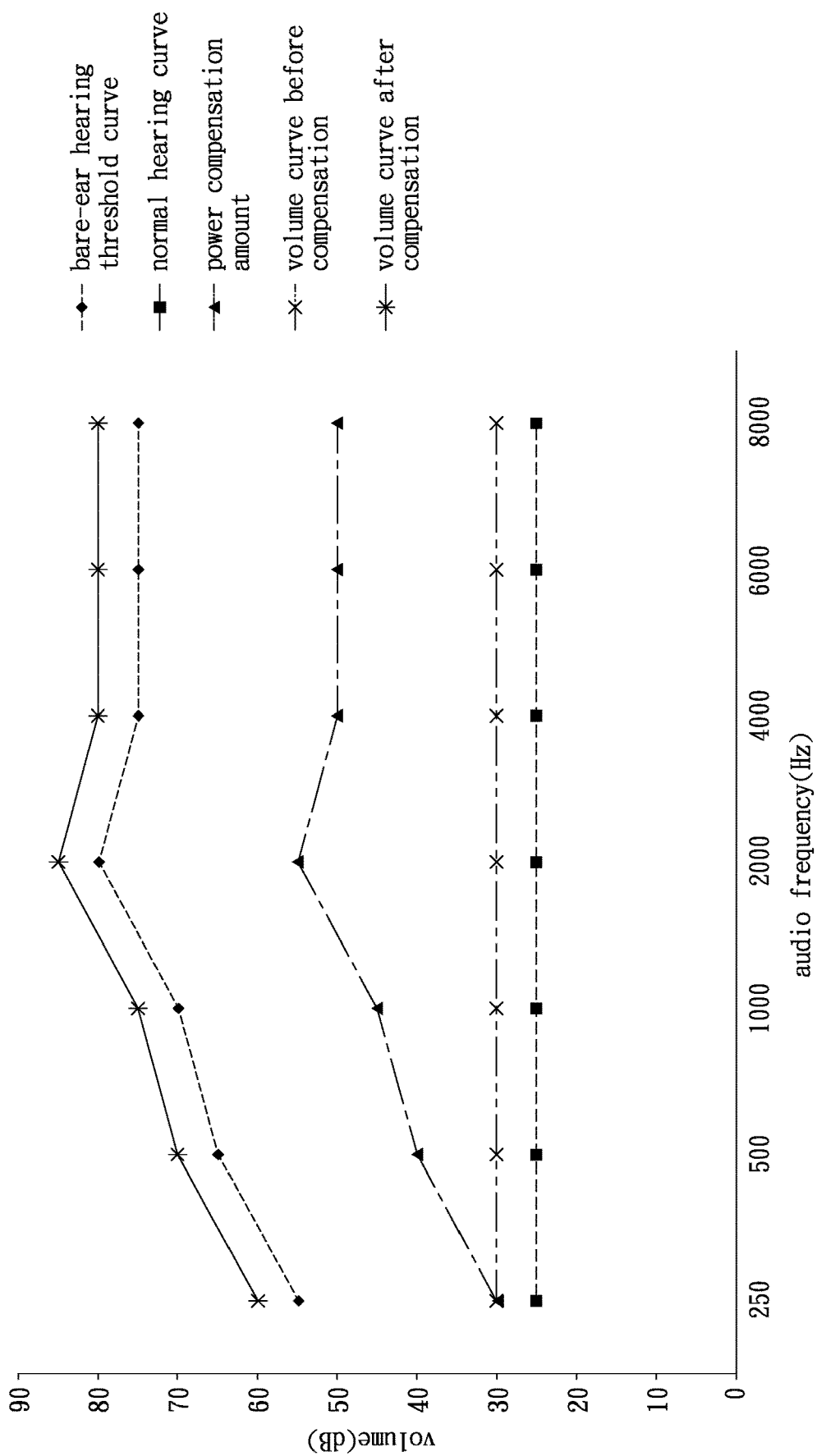
FIG. 5 is an illustration of a bare-ear hearing threshold curve, a normal hearing curve, a power compensation amount, a volume curve before compensation, and a volume curve after compensation in an application example of the present invention.

Please refer to FIG. 5. The following uses the data of a hearing-impaired person as an example to specifically describe the technical solution of the present invention:

Using a hearing test instrument, the volume (dB) when the hearing-impaired person can clearly hear the sound at the audio frequency nodes of 250 Hz, 500 Hz, 1000 Hz, 2000 Hz, 4000 Hz, 6000 Hz and 8000 Hz is 55 dB, 65 dB, 70 dB, 80 dB, 75 dB and 75 dB respectively, so as to obtain the bare-ear hearing threshold curve of the hearing impaired person.

The upper limit of the volume (dB) of the normal hearing curve is 25 dB. Based on this, at the audio frequency nodes of 250 Hz, 500 Hz, 1000 Hz, 2000 Hz, 4000 Hz, 6000 Hz and 8000 Hz, the power compensation of 30 dB, 40 dB, 45 dB, 55 dB, 50 dB and 50 dB can make the hearing of the hearing-impaired person reach the level of the normal hearing curve. The hearing compensation curve can be obtained according to the above power compensation amount (dB).

Under normal hearing, the audio frequency nodes of 250 Hz, 500 Hz, 1000 Hz, 2000 Hz, 4000 Hz, 6000 Hz and 8000 Hz are all set to 30 dB by default. After power compensation using the hearing compensation curve, the audio system outputs the volume of 60 dB, 70 dB, 75 dB, 85 dB, 80 dB and 80 dB at the audio frequency nodes of 250 Hz, 500 Hz, 1000 Hz, 2000 Hz, 4000 Hz, 6000 Hz and 8000 Hz, respectively.

Using this as the volume output, the hearing-impaired person can obtain a volume equivalent to 30 dB under normal hearing levels at any audio frequency.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hearing-aid audio control method, comprising the steps of:
    S1: obtaining a hearing compensation curve of a hearing-impaired person in advance;
    S2: receiving and obtaining an original audio signal;
    S2.1: determining a type of the received signal;
    S2.2: if the received signal is a pure digital audio signal, converting the pure digital audio signal into an analog audio signal, using the analog audio signal as the original audio signal, and proceeding to the step S3;
    S2.3: if the received signal is a digital audio-visual signal, separating a digital audio signal from the digital audio-visual signal, converting the digital audio signal into the analog audio signal, using the analog audio signal as the original audio signal, and proceeding to the step S3;
    S2.4: if the received signal is the analog audio signal, using the analog audio signal as the original audio signal, and proceeding to the step S3;
    S3: using the hearing compensation curve to perform power compensation on a corresponding frequency band of the original audio signal to obtain a hearing-aid audio signal; and
    S4: outputting the hearing-aid audio signal and/or using the hearing-aid audio signal to drive operation of an audio system.

2. The hearing-aid audio control method as claimed in claim 1, wherein the step S1 includes:
    S1.1: selecting a plurality of audio frequency nodes for conducting a hearing test on the hearing-impaired person to obtain a bare-ear hearing threshold curve of the hearing-impaired person;
    S1.2: performing power compensation on impaired audio frequency nodes of the hearing-impaired person according to the bare-ear hearing threshold curve until a hearing curve of the hearing-impaired person falls within a range of a normal hearing curve;
    S1.3: in the step S1.2, recording a power compensation amount at each of the audio frequency nodes to form a hearing compensation curve.

3. The hearing-aid audio control method as claimed in claim 2, wherein in the step S1.1, the selected audio frequency nodes include at least one of 250 Hz, 500 Hz, 1000 Hz, 2000 Hz, 4000 Hz, 6000 Hz and 8000 Hz.

4. The hearing-aid audio control method as claimed in claim 1, wherein in the step S3, the hearing compensation curve is superimposed on the original audio signal.

5. A hearing-aid audio system, comprising:
    a hearing-aid compensation module, configured to obtain a hearing compensation curve of a hearing-impaired person in advance;
    a signal receiving module includes:
        a signal determination sub-module, configured to determine a type of the received signal;
        a digital audio signal separation sub-module, configured to separate a digital audio signal from a digital audio-visual signal;
        a digital-to-analog conversion sub-module, configured to convert the digital audio signal into an analog audio signal as the original audio signal; and
        an output module, configured to output the original audio signal to the compensation processing module;
    the signal receiving module is configured to receive and obtain an original audio signal;
    a compensation processing module, configured to use the hearing compensation curve to perform power compensation on a corresponding frequency band of the original audio signal to obtain a hearing-aid audio signal; and
    an output driving module, configured to output the hearing-aid audio signal and/or use the hearing-aid audio signal to drive operation of the audio system.

6. The hearing-aid audio system as claimed in claim 5, wherein the hearing-aid compensation module includes:

a hearing test sub-module, configured to select a plurality of audio frequency nodes to conduct a hearing test for the hearing-impaired person;

a bare-ear hearing threshold curve generation sub-module, configured to generate a bare-ear hearing threshold curve according to a test result of the hearing test sub-module;

a power compensation sub-module, configured to perform power compensation on impaired audio frequency nodes of the hearing-impaired person according to the bare-ear hearing threshold curve until a hearing curve of the hearing-impaired person falls within a range of a normal hearing curve, and record a power compensation amount at each of the audio frequency nodes to form the hearing compensation curve;

a compensation output sub-module, configured to output the hearing compensation curve.

7. The hearing-aid audio system as claimed in claim 6, wherein in the hearing test sub-module, the selected audio frequency nodes include at least one of 250 Hz, 500 Hz, 1000 Hz, 2000 Hz, 4000 Hz, 6000 Hz and 8000 Hz.

8. The hearing-aid audio system as claimed in claim 5, wherein the compensation processing module is configured to superimpose the hearing compensation curve on the original audio signal.

\* \* \* \* \*